United States Patent
Adachi et al.

(10) Patent No.: US 12,333,136 B2
(45) Date of Patent: Jun. 17, 2025

(54) INFORMATION PROCESSING DEVICE, INFORMATION PROCESSING METHOD, AND INFORMATION PROCESSING PROGRAM

(71) Applicant: Sony Group Corporation, Tokyo (JP)

(72) Inventors: Hiroaki Adachi, Tokyo (JP); Seiji Muramatsu, Tokyo (JP); Naoki Iwata, Tokyo (JP); Kenji Yokoyama, Tokyo (JP); Kazuki Kozuma, Tokyo (JP); Toshiyuki Kimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/044,575

(22) PCT Filed: Aug. 10, 2021

(86) PCT No.: PCT/JP2021/029504
§ 371 (c)(1),
(2) Date: Mar. 9, 2023

(87) PCT Pub. No.: WO2022/059386
PCT Pub. Date: Mar. 24, 2022

(65) Prior Publication Data
US 2023/0376195 A1    Nov. 23, 2023

(30) Foreign Application Priority Data

Sep. 16, 2020  (JP) ................................ 2020-155832

(51) Int. Cl.
| | | |
|---|---|---|
| G06F 3/04886 | (2022.01) |
| G06F 3/041 | (2006.01) |
| G06F 3/04847 | (2022.01) |
| G06F 9/451 | (2018.01) |

(52) U.S. Cl.
CPC ........ *G06F 3/04886* (2013.01); *G06F 3/0416* (2013.01); *G06F 3/04847* (2013.01); *G06F 9/451* (2018.02); *G06F 2203/04803* (2013.01)

(58) Field of Classification Search
CPC .............. G06F 3/04886; G06F 3/0416; G06F 3/04847; G06F 3/0486; G06F 3/0481;
(Continued)

(56) References Cited

U.S. PATENT DOCUMENTS

| | | | |
|---|---|---|---|
| 2010/0138763 A1* | 6/2010 | Kim ...................... G06F 1/1643 |
| | | | 715/810 |
| 2011/0061012 A1* | 3/2011 | Lim ....................... G06F 9/451 |
| | | | 715/810 |

(Continued)

FOREIGN PATENT DOCUMENTS

| | | |
|---|---|---|
| EP | 3779684 A | 2/2021 |
| WO | WO-2019233306 A1 | 12/2019 |

OTHER PUBLICATIONS

International Search Report and Written Opinion mailed on Oct. 12, 2021, received for PCT Application PCT/JP2021/029504, filed on Aug. 10, 2021, 9 pages including English Translation.
(Continued)

*Primary Examiner* — Brent D Castiaux
(74) *Attorney, Agent, or Firm* — XSENSUS, LLP

(57) ABSTRACT

Further improvement in usability is promoted. An information processing device (10) includes a control unit (140) that executes processing of displaying an operation area having a predetermined shape in an edge area of a display screen, and moving the operation area to a center area of the display screen by a first operation set in advance as a predetermined operation on the operation area.

16 Claims, 8 Drawing Sheets

(58) Field of Classification Search
CPC ............... G06F 3/04817; G06F 3/0482; G06F 3/04883; G06F 9/451; G06F 2203/04803
See application file for complete search history.

(56) References Cited

U.S. PATENT DOCUMENTS

| | | | |
|---|---|---|---|
| 2013/0093680 A1 | 4/2013 | Ogita | |
| 2016/0103567 A1* | 4/2016 | Wengelnik | G06F 3/0486 715/779 |
| 2019/0324603 A1* | 10/2019 | Shin | G06F 3/04886 |

OTHER PUBLICATIONS

"[Huawei smartphone] [EMUI 9.0] How to customize and use the navigation bar", Huawei Mate 10, EMUI9, NIF Paradise 2017, Available Online At: https://solodc2017.com/huawei-mate-10/emui9/2-system-navigation, May 31, 2020, pp. 1-8.

"Approaches to Use and Recommended Settings for AssistiveTouch "Custom Actions", Which Enable Customization of iPhone Operations.", Vellio Inc., Available Online At: https://apllio.com/ios-assistive-touch-custmo-action-iphone-ipad-13642, Aug. 14, 2020, pp. 1-20.

"Chiehon. 10 Settings and Convenience Functions You'll Want to Know to Handle the Huawei P40 lite 5G", K.K. All Connect Mobile, Available Online At: https://mobareco.jp/al95778/, Jul. 22, 2020, pp. 1-38.

"The Long Press Did It! How to Get Rid of Buttons That Won't Go Away—Floating Buttons", Available Online At: https://youtube.com/watch?v=FAH15pfN4MI, Jun. 12, 2020, 1 page.

"The Long Press Did It! How to Get Rid of Buttons That Won't Go Away—Floating Buttons", Available Online At: https://chiilabo.com/2020/06/long-touch-floating-button-delete/, Jun. 12, 2020, pp. 1-4.

* cited by examiner

INFORMATION PROCESSING DEVICE, INFORMATION PROCESSING METHOD, AND INFORMATION PROCESSING PROGRAM

CROSS-REFERENCE TO RELATED APPLICATIONS

The present application is based on PCT filing PCT/JP2021/029504, filed Aug. 10, 2021, which claims priority to Japanese Application No. 2020-155832, filed Sep. 16, 2020, the entire contents of each are incorporated herein by reference.

FIELD

The present disclosure relates to an information processing device, an information processing method, and an information processing program.

BACKGROUND

In a recent device including a touch panel, a technique for supporting an operation with a user's finger has been developed.

CITATION LIST

Patent Literature

Patent Literature 1: US 2013/0093680 A1

SUMMARY

Technical Problem

The conventional technique, however, still has room for promoting further improvement in usability.

Therefore, the present disclosure proposes a new and improved information processing device, an information processing method, and an information processing program capable of promoting further improvement in usability.

Solution to Problem

According to the present disclosure, an information processing device is provided that includes a control unit that executes processing of displaying an operation area having a predetermined shape in an edge area of a display screen, and moving the operation area to a center area of the display screen by a first operation set in advance as a predetermined operation on the operation area.

Moreover, according to the present disclosure, an information processing method performed by an information processing device is provided that includes executing processing of displaying an operation area having a predetermined shape in an edge area of a display screen, and moving the operation area to a center area of the display screen by a first operation set in advance as a predetermined operation on the operation area.

Moreover, according to the present disclosure, an information processing program is provided that causes an information processing device to execute processing of displaying an operation area having a predetermined shape in an edge area of a display screen, and moving the operation area to a center area of the display screen by a first operation set in advance as a predetermined operation on the operation area.

DESCRIPTION OF EMBODIMENTS

Hereinafter, a preferred embodiment of the present disclosure will be described in detail with reference to the accompanying drawings. Note that in this description and the drawings, components having substantially the same functional configuration are denoted by the same reference signs, and redundant description is omitted.

Note that the description will be given in the following order.
1. Embodiment
 1.1. Introduction
 1.2. Appearance Configuration Example
 1.3. Functional Configuration Example
 1.4. Details of Functions
2. Modification of Embodiment
3. Example of Operation Flow
4. Hardware Configuration Example
5. Summary

1. EMBODIMENT

1.1. Introduction

In a recent device including a touch panel, a technique for supporting an operation with a user's finger has been developed. For example, Patent Literature 1 discloses a technique for controlling a position of a controller displayed on a screen based on a position of a user's finger detected by a sensor provided on a back surface of a device.

However, in the technique disclosed in Patent Literature 1, the device needs to separately include a sensor for detecting a finger. Furthermore, the technique disclosed in Patent Literature 1 may fail to optimize operations on a small device used with one hand such as a smartphone.

Therefore, the present disclosure proposes a new and improved information processing device, an information processing method, and an information processing program capable of promoting further improvement in usability.

1.2. Appearance Configuration Example

Figure 1:
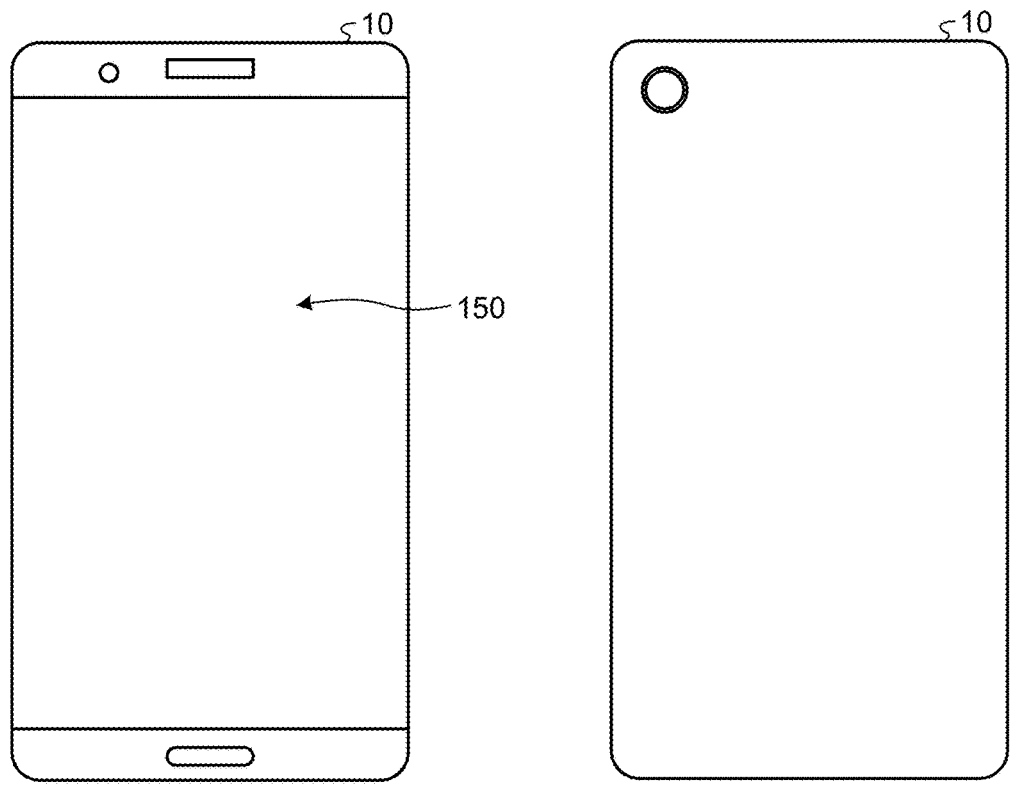
FIG. 1 is a diagram illustrating an example of an appearance configuration of an information processing device 10 of the present disclosure.

FIG. 1 is a diagram illustrating an example of an appearance configuration of an information processing device 10 of the present disclosure. On the left side of FIG. 1, the front surface of the information processing device 10 is illustrated. On the right side of FIG. 1, the back surface of the information processing device 10 is illustrated. The information processing device 10 is, for example, a smartphone (a mobile terminal). Alternatively, the information processing device 10 may be a tablet terminal.

The information processing device 10 includes a display unit 150. The display unit 150 covers a sensor unit 110 described below. Such a configuration enables the information processing device 10 to detect a user's finger in contact with the display unit 150. Note that the display unit 150 may cover a part or the whole of the information processing device 10.

Figure 2:
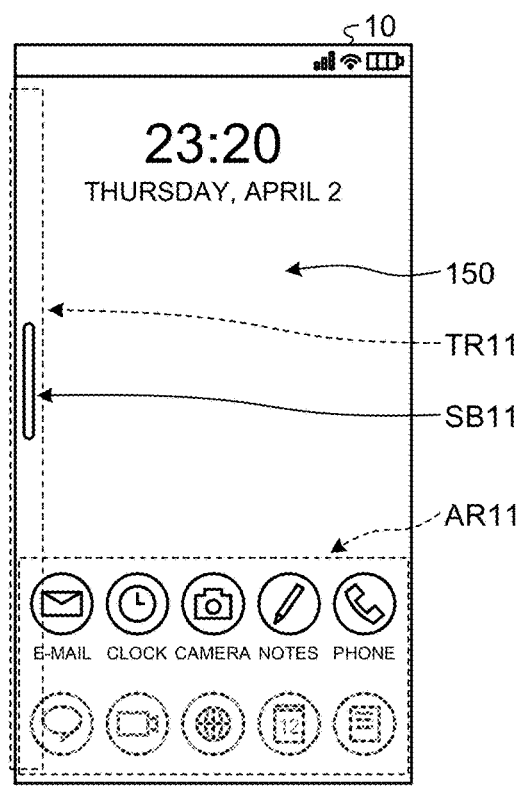
FIG. 2 is a diagram illustrating an example of a display screen of the information processing device 10 according to the embodiment.

FIG. 2 is a diagram illustrating an example of a display screen of the information processing device 10 of the present disclosure. The information processing device can control the content of the display screen based on a user input. For example, the information processing device can display, on the display unit 150, execution information related to execution of a function of an application using a so-called graphical user interface (GUI). Here, the execution information includes, for example, an icon for causing an application to execute predetermined processing, or visual information, such as a result of the predetermined processing executed by the application or the like. For example, the execution information is an application launcher. In FIG. 2, execution information AR11 is displayed on the display unit 150. Hereinafter, an icon of an application may be referred to as an application.

The information processing device 10 can display, on the display unit 150, an operation area having a predetermined shape in the edge area of the display screen by using the GUI. The operation area, here, is, for example, display information for displaying the execution information recommended to a user. The example includes display information called side sense (registered trademark). Consequently, the user can call the application launcher. In FIG. 2, an operation area SB11 is displayed in an edge area TR11. FIG. 2 illustrates the case where the operation area SB11 is displayed in the center portion of the edge area TR11, but the operation area SB11 may be displayed at any position. For example, the operation area SB11 may be displayed in an upper portion or a lower portion of the edge area TR11. Alternatively, FIG. 2 illustrates the case where the operation area SB11 is displayed on the left side of the display screen, but may be displayed on the right side. In this case, the operation area SB11 is displayed on an edge area on the right side of the display screen.

A display mode (for example, size, shape, and color) of the operation area SB11 is not limited to particular modes. For example, the display mode of the operation area SB11 can be changed from the default by setting. As a specific example, the transparency of the operation area SB11 may be increased to make the operation area SB11 lighter so as to be hardly visible. Furthermore, the display mode of the operation area SB11 is changed by a predetermined operation. Furthermore, the operation area SB11 moves on the display screen by a predetermined operation.

1.3. Functional Configuration Example

Figure 3:
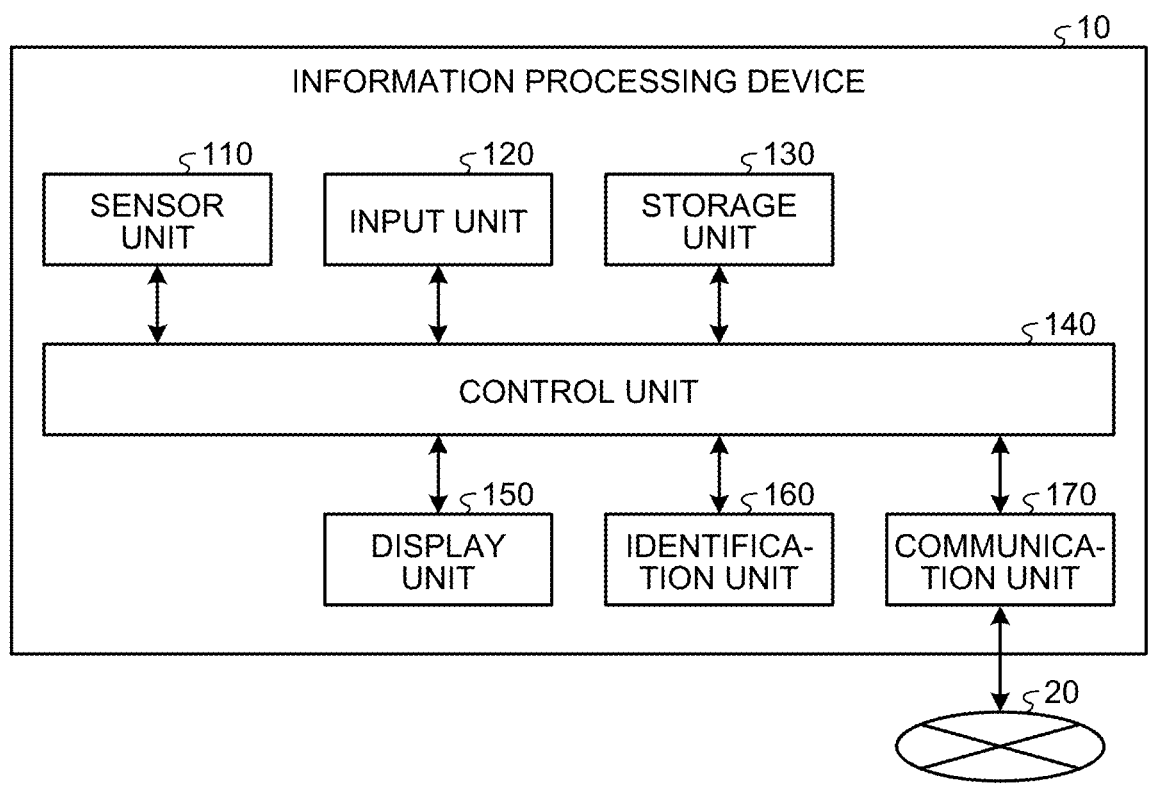
FIG. 3 is a diagram illustrating an example of a functional configuration of the information processing device 10 according to the embodiment.

Next, an example of a functional configuration of the information processing device 10 according to the embodiment will be described. FIG. 3 is a diagram illustrating an example of a functional configuration of the information processing device 10 according to the embodiment. As illustrated in FIG. 3, the information processing device 10 is an information processing device including the sensor unit 110, an input unit 120, a storage unit 130, a control unit 140, the display unit 150, an identification unit 160, and a communication unit 170.

(Sensor Unit 110)

The sensor unit 110 according to the present embodiment has a function of detecting contact of a user's finger with the information processing device 10. Here, the sensor unit 110 can detect a position of the user's finger in contact with the front surface of the information processing device 10. Note that the sensor unit 110 is implemented by, for example, a capacitive touch sensor or a pressure-sensitive touch sensor.

Furthermore, the sensor unit 110 may detect a position of an operation finger that has executed a trigger operation on the display unit 150. Here, the trigger operation includes an operation on the operation area. Specifically, the trigger operation is a tap, a double tap, a press, a long press and drag, an upward slide, a downward slide, or the like. The slide may be an operation of swiping with a finger. The long press and drag may be a long tap. Furthermore, the operation finger is, for example, a finger that performs an operation on the display unit 150 to operate the operation area among a plurality of fingers of a user holding the information processing device 10.

(Input Unit 120)

The input unit 120 according to the present embodiment has a function of collecting sensor information regarding user's behavior using various sensors. The input unit 120 includes, for example, an acceleration sensor, a gyro sensor, a geomagnetic sensor, a vibration sensor, a global navigation satellite system (GNSS) signal reception device, and the like.

(Storage Unit 130)

The storage unit 130 according to the present embodiment is a storage area for temporarily or permanently storing various types of programs and data. For example, the storage unit 130 may store programs and data for the information processing device 10 to execute various functions. As a specific example, the storage unit 130 may store a program for executing various applications, management data for managing various settings, and the like. Of course, merely an example has been described, and the type of data stored in the storage unit 130 is not limited to a particular type.

(Control Unit 140)

The control unit 140 according to the present embodiment controls each component included in the information processing device 10. Furthermore, the control unit 140 determines whether an operation has been performed on the operation area based on the operation finger detected position on the display unit 150. For example, in a case where the operation finger detected position is within the range of the operation area, the control unit 140 determines that the operation is performed on the operation area. The range of the operation area is, for example, a display range in which the operation area is displayed.

Here, different types of processing executed by the control unit 140 are assigned to the respective operations on the operation area. For example, when detecting that a first operation is performed, the control unit 140 executes processing of moving the operation area. For example, in a case where a long press and drag operation is assigned (set) in advance as the first operation, the control unit 140 executes processing of moving the operation area upon the user's long press and drag on the operation area. The time period regarding the long press of the long press and drag is not limited to a particular value. At this time, for example, the control unit 140 executes processing of moving the operation area so as to follow the operation finger detected position on the display unit 150.

Furthermore, when the moving processing of the operation area is executed, the control unit 140 executes processing of changing the shape of the operation area. Then, when the operation area moves or positions in an area other than the edge area (hereinafter, it is appropriately referred to as a "center area".), the control unit 140 executes the processing of changing the shape of the operation area. For example, the control unit 140 executes processing of changing the shape of the operation area from a bar shape when the operation area is in the edge area to a circular shape when it is in the center area. Note that when the operation area moves in the edge area, the control unit 140 may execute processing of moving without changing the shape of the operation area. For example, the control unit 140 may execute processing of moving the edge area upward and downward keeping a bar shape.

As described above, when the time period regarding the long press of the long press and drag on the operation area by a user exceeds a predetermined threshold value, the control unit 140 executes processing of controlling so that the user can freely move the operation area having a bar shape as if the operation area floats. Then, when the user drags the center area without lifting the finger, the control unit 140 executes processing of changing the shape of the operation area to a circular shape. Hereinafter, the operation area changed to have a circular shape may be referred to as a float icon. Then, when the user moves the operation area to the edge area side with respect to a predetermined coordinate on the display screen, the control unit 140 executes processing of changing the shape to the bar shape again.

Furthermore, for example, when detecting that a second operation is performed, the control unit 140 executes processing of displaying execution information related to execution of a function of an application. Note that the execution information displayed by the second operation is hereinafter appropriately referred to as a "side sense menu". The side sense menu displays, for example, recommended applications that are estimated from a user's usage of the information processing device 10 and the like. Consequently, the user can start the applications displayed in the side sense menu. The user can also turn on/off the function of the applications displayed in the side sense menu. Note that the user may select applications to be displayed in the side sense menu.

In a case where, for example, a double tap operation is assigned as the second operation in advance, the control unit 140 executes processing of displaying the side sense menu upon the user's double tap on the operation area. At this time, the control unit 140 executes processing of displaying the side sense menu at a position corresponding to the position of the operation area. That is, the control unit 140 executes processing of determining an area for displaying the side sense menu based on position information of the operation area. Furthermore, the control unit 140 may execute processing of controlling to close the side sense menu by, for example, a double tap on the operation area again or a tap on an area other than the display area of the side sense menu.

Figure 4:
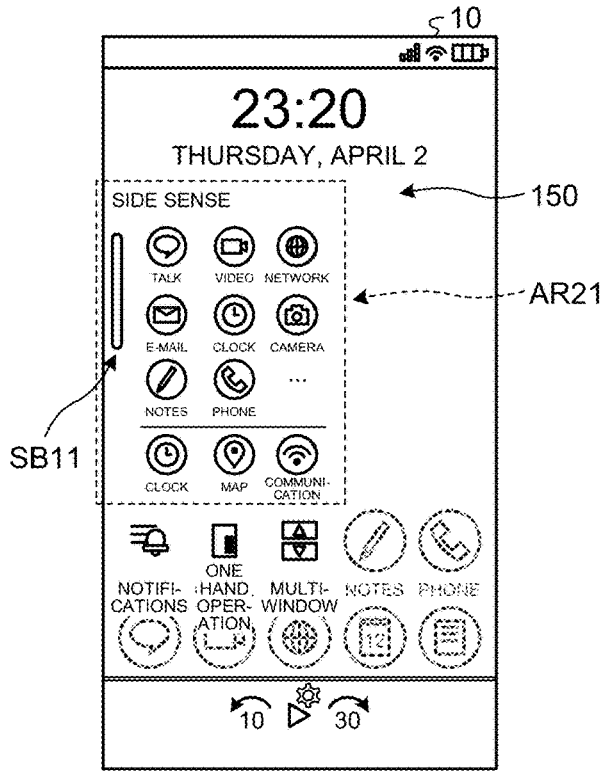
FIG. 4 is a diagram illustrating an example of a side sense menu according to the embodiment.

FIG. 4 is a diagram illustrating an example of the side sense menu of the present disclosure. In FIG. 4, when detecting a double tap on the operation area SB11, the control unit 140 executes processing of displaying the execution information AR21, which is the side sense menu. At this time, for example, the control unit 140 executes processing of displaying the execution information AR21 at a position within a predetermined range from the operation area SB11. Note that the execution information AR21 is not limited to the execution information related to execution of a function of an application, and may include any information. For example, the execution information AR21 may include setting information for setting the side sense menu, and display information for displaying a multi-window menu described below. Furthermore, a display mode of the execution information AR21 is not limited to particular modes. Furthermore, types, the number, a display order, and the like of the applications included in the execution information AR21 are not limited.

Furthermore, for example, when detecting that a third operation is performed, the control unit 140 executes processing of displaying execution information related to execution of a function of an application. Note that the execution information displayed by the third operation is hereinafter appropriately referred to as a "multi-window menu". For example, the multi-window menu divides a display screen to display a plurality of applications simultaneously. For example, the multi-window menu creates and displays a shortcut for a pair of applications that are frequently used by a user. Consequently, the user can operate the plurality of applications simultaneously.

In a case where, for example, an upward slide operation is assigned as the third operation in advance, the control unit 140 executes processing of displaying the multi-window menu upon the user's upward slide on the operation area. At this time, the control unit 140 executes processing of displaying the multi-window menu at a position corresponding to the position of the operation area. That is, the control unit 140 executes processing of determining an area for displaying the multi-window menu based on position information of the operation area. Furthermore, the control unit 140 may execute processing of displaying the multi-window menu by a tap on the display information for displaying the multi-window menu of the side sense menu, for example. Furthermore, the control unit 140 may execute processing of controlling to close the multi-window menu by, for example, a double tap on the operation area again or a tap on an area other than the display area of the multi-window menu.

Figure 5:
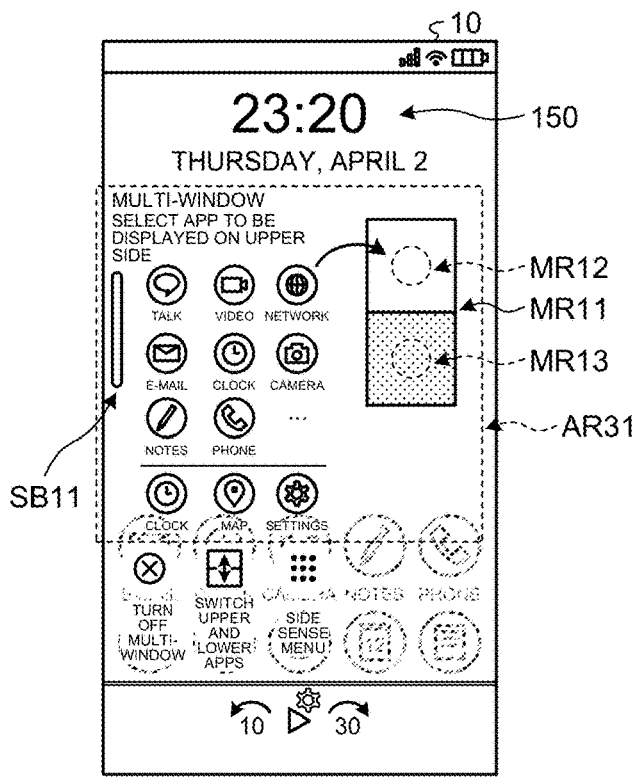
FIG. 5 is a diagram illustrating an example of a multi-window menu according to the embodiment.

FIG. 5 is a diagram illustrating an example of the multi-window menu of the present disclosure. In FIG. 5, when detecting an upward slide on the operation area SB11, the control unit 140 executes processing of displaying the execution information AR31, which is a multi-window menu. At this time, for example, the control unit 140 executes processing of displaying the execution information AR31 at a position within a predetermined range from the operation area SB11. Note that the execution information AR31 is not limited to the execution information related to execution of a function of an application, and may include any information. For example, the execution information AR31 may include setting information of the multi-window menu. Furthermore, a display mode of the execution information AR31 is not limited to particular modes. Furthermore, types, the number, a display order, and the like of the applications included in the execution information AR31 are not limited.

Furthermore, the execution information AR31 includes a display area MR11 on which a plurality of applications is displayed simultaneously. The display area MR11 is the display information for selecting two applications to be displayed on the upper side and the lower side thereof. Note that FIG. 5 illustrates a case of selecting two applications, but the present invention is not limited to this example, and three or more applications may be selected. For example, by a tap on an application displayed in the multi-window menu, the control unit 140 determines a plurality of applications to be simultaneously displayed.

FIG. 5 illustrates a case where an application to be displayed on the upper side is firstly selected. For example, by a tap on an application displayed in the multi-window menu, the control unit 140 determines the application to be displayed on the upper side. Then, although not illustrated, an icon of the determined application is displayed in a display area MR12. Although not illustrated, upon determining the application to be displayed on the upper side, the processing transitions to selection of an application to be displayed on the lower side. Then, by a tap on an application displayed in the multi-window menu, the control unit 140 determines the application to be displayed on the lower side. Then, although not illustrated, the icon of the determined application is displayed in the display area MR13. Consequently, a user can set a pair of a plurality of applications that can be simultaneously displayed and operated.

For example, when detecting that a fourth operation is performed, the control unit 140 executes processing of returning to the previous display screen. In a case where, for example, a downward slide operation is assigned as the fourth operation in advance, the control unit 140 executes processing of returning to the previous display screen upon the user's downward slide on the operation area. For example, the control unit 140 executes processing of closing the side sense menu or the multi-window menu.

(Display Unit 150)

The display unit 150 according to the present embodiment displays various types of visual information based on control by the control unit 140. For example, the display unit 150 is a touch panel having a function of displaying, on the display screen, the execution information related to execution of a function of an application. Furthermore, the display unit 150 may display, for example, an image, a character, or the like related to an application. For this purpose, the display unit 150 includes various display devices such as a liquid crystal display (LCD) device, an organic light emitting diode (OLED) display device, and the like. Furthermore, the display unit 150 can also superimpose and display the UI of the operation area in a layer higher than the screen of the of an application or execution information that is displayed.

(Identification Unit 160)

The identification unit 160 according to the present embodiment has a function of identifying a predetermined application based on a predetermined criterion. Here, the predetermined criterion includes, for example, a current time, a current location, a use frequency of various applications or the like. For example, the identification unit 160 may identify, among various applications stored in the storage unit 130, an application that is used more often than the other applications.

The identification unit 160 may identify an application using a model constructed by machine learning of operations on the information processing device 10 by a user or the predetermined criterion. The machine learning may be, for example, machine learning using a neural network such as deep learning or the like. Note that the constructed model may be stored in the storage unit 130.

Furthermore, the identification unit 160 may identify an application by using information obtained by machine learning from data related to use of terminals by a plurality of users that is received from another device via a network 20 described below. The execution information related to the application can be displayed to the user by the display unit 150 controlled by the control unit 140.

Here, the application to be displayed can be identified by the identification unit 160 based on the predetermined criterion. The control unit 140 executes processing of displaying, on the display unit 150, the plurality of applications identified by the identification unit 160. Here, for example, the control unit 140 may execute processing of displaying applications that are used more often than the other applications at a higher position on the display screen of the display unit 150.

(Communication Unit 170)

The communication unit 170 according to the present embodiment has a function of communicating with another device via the network 20 described later. The communication unit 170 may receive information obtained by machine learning from data related to the above-described use of terminals by the plurality of users, for example, from another device.

(Network 20)

The network 20 according to the present embodiment has a function of connecting each configuration included in the information processing system. The network 20 may include a public line network such as the Internet, a telephone line network, or a satellite communication network, various local area networks (LANs) including Ethernet (registered trademark), a wide area network (WAN), or the like. Furthermore, the network 20 may include a private line network such as an Internet protocol-virtual private network (IP-VPN) or the like. Furthermore, the network 20 may include a wireless communication network such as Wi-Fi (registered trademark) or Bluetooth (registered trademark), or the like.

The functional configuration example of the information processing device 10 according to the present embodiment has been described above. Note that the functional configuration described above with reference to FIG. 3 is merely an example, and the functional configuration of the information processing device 10 according to the present embodiment is not limited to such an example. For example, the information processing device may not necessarily include all of the components illustrated in FIG. 3. For example, the storage unit 130 and the identification unit 160 can be provided in another device different from the information processing device 10. The functional configuration of the information processing device 10 according to the present embodiment can be flexibly modified according to specifications and operations.

Furthermore, the functions of the respective components may be performed by reading a control program from a storage medium such as a read only memory (ROM) or a random access memory (RAM) storing the control program that describes a processing procedure with which a processing unit such as a central processing unit (CPU) implement these functions, and interpreting and executing the program. Thus, it is possible to appropriately change the configuration to be used according to the technical level at the time of carrying out the present embodiment. Furthermore, an example of a hardware configuration of the information processing device 10 will be described below.

1.4. Details of Functions

Next, the operation of the control unit 140 according to the present embodiment will be described in detail with reference to specific examples.

Figure 6:
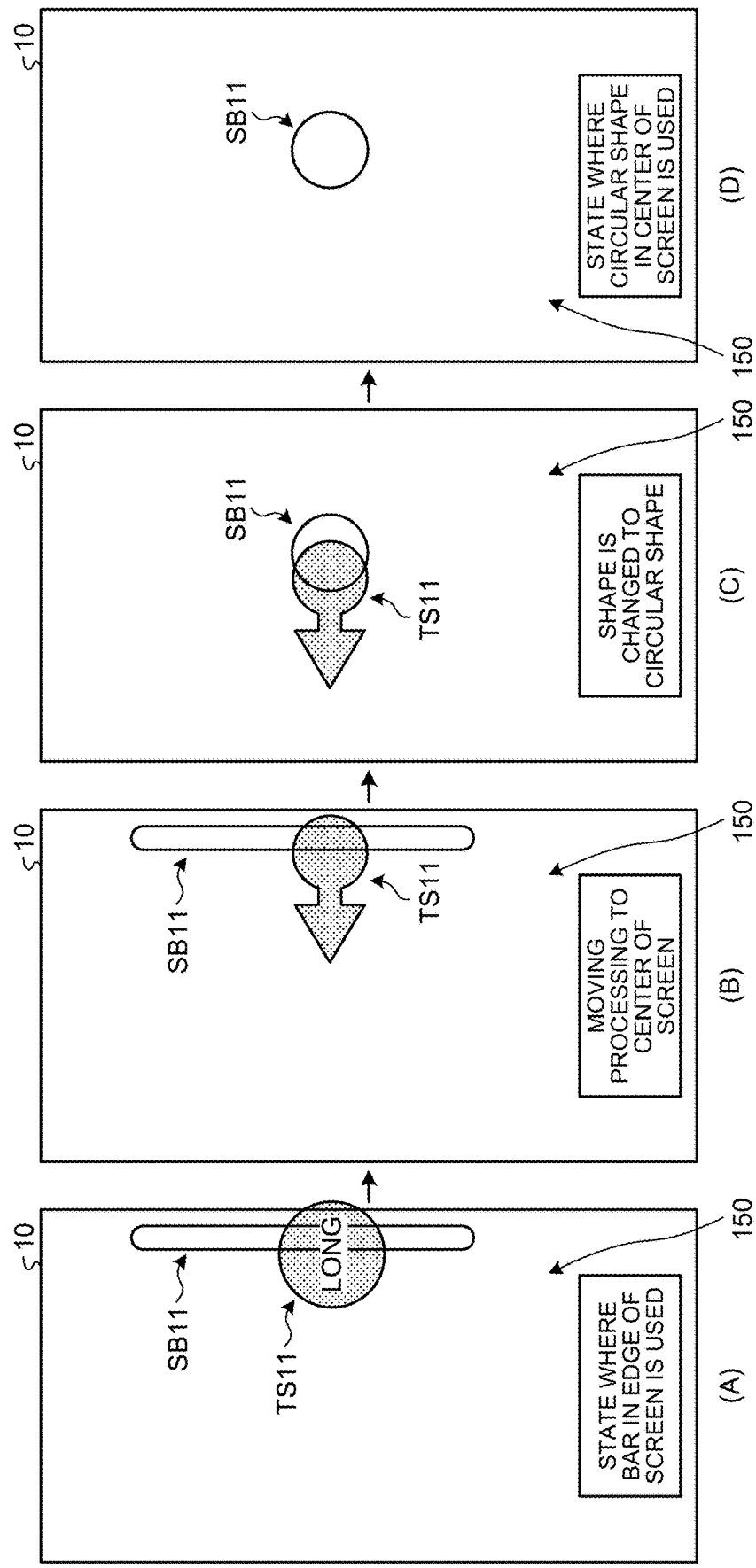
FIG. 6 is a diagram illustrating an example of an operation related to moving of an operation area according to the embodiment.

FIG. 6 is a diagram illustrating an example of an operation related to moving of an operation area according to the embodiment. The operation area SB11 having a bar shape is displayed on the display unit 150 in FIG. 6(A). An operation finger detected position TS11 is displayed on the display unit 150 in FIG. 6(A). In FIG. 6(A), upon a long press and drag on the operation area SB11 by the operation finger, the control unit 140 executes processing of moving the operation area SB11. As illustrated in FIG. 6(B), upon a drag to the left side by the operation finger, the control unit 140 executes processing of moving the operation area SB11 to the left side based on the operation finger detected position TS11.

As illustrated in FIG. 6(C), when the moving processing is executed and the operation finger enters the center area of the display unit 150, the control unit 140 executes processing of changing the shape of the operation area SB11 from a bar shape to a circular shape. As illustrated in FIG. 6(D), when a user lifts the operation finger from the display unit 150, the control unit 140 ends the moving processing with the operation area SB11 left at a position where the operation finger is lifted. Consequently, the user can place the operation area SB11 freely at any position on the display screen.

Furthermore, the control unit 140 executes processing of maintaining the operability regardless of the position of the operation area SB11 on the display screen. The control unit 140 executes processing of controlling so that the operation area can be operated in the same way maintaining the operability regardless of whether the operation area SB11 is located in the edge area or in the center area, for example. Specifically, the control unit 140 executes processing of controlling so that the same operation is performed by the same trigger operation (for example, the first operation to the fourth operation). Furthermore, the control unit 140 executes processing of maintaining the operability regardless of the shape of the operation area SB11. For example, regardless of whether the operation area SB11 has a bar shape or a circular shape, the control unit 140 executes processing of controlling so as to maintain the operability to operate the operation area in the same way. As described above, even in a case where the shape of the operation area SB11 changes, the control unit 140 executes processing of controlling so that the operation on the operation area after change can perform the same operation to the operation on the operation area before change.

Figure 7:
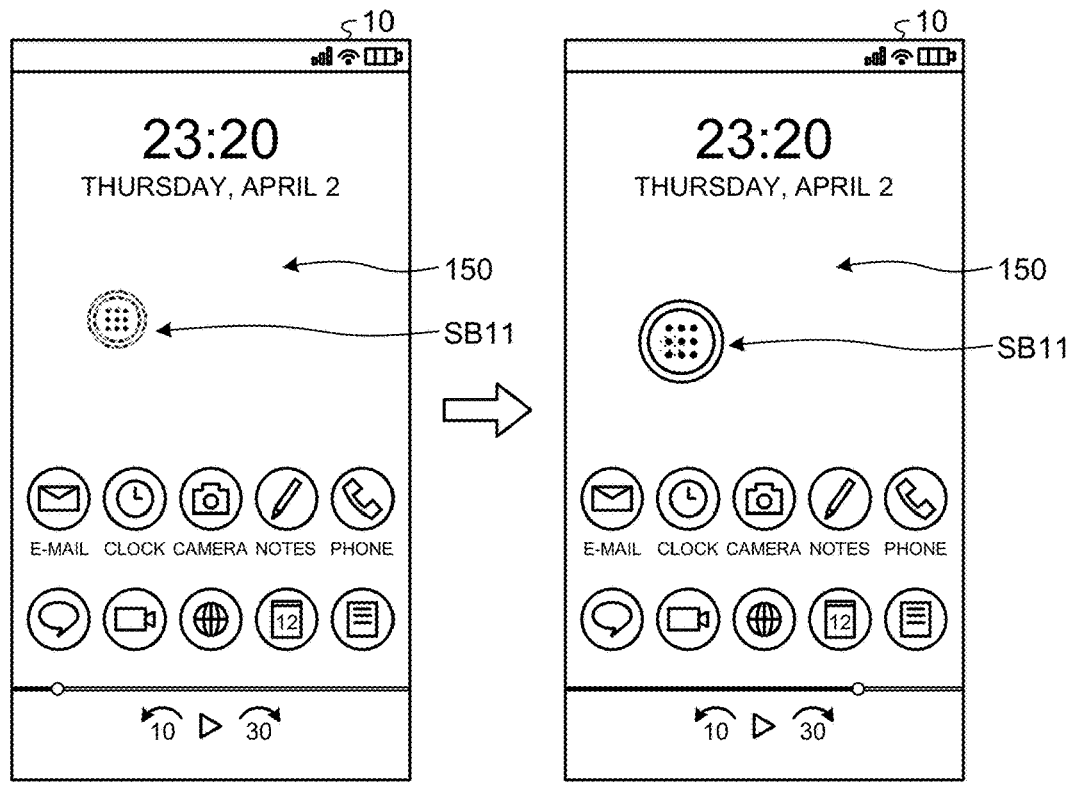
FIG. 7 is a diagram illustrating an example of a display mode of the operation area according to the embodiment.

FIG. 7 is a diagram illustrating an example of a display mode of the operation area according to the embodiment. In FIG. 7, since the operation area SB11 is located in the center area of the display unit 150, the shape is circular. The left side of FIG. 7 illustrates a display mode of the operation area SB11 in a state where the moving processing is not performed. For example, FIG. 6(D) illustrates a state in which the moving processing is completed. The right side of FIG. 7 illustrates a display state of the operation area SB11 in a state where the moving processing is being performed. The operation area SB11 illustrated on the right side of FIG. 7 is displayed in a more conspicuous manner than the operation area SB11 illustrated on the left side of FIG. 7.

As described above, in a case where the moving processing of the operation area SB11 is performed, the control unit 140 may execute processing of displaying the operation area SB11 in a specific mode different from a case where the moving processing of the operation area SB11 is not performed. For example, the control unit 140 may execute processing of displaying the operation area SB11 with larger size than in a case where the moving processing is not performed. Furthermore, for example, the control unit 140 may execute processing of displaying the operation area SB11 with higher color density or brightness than in a case where the moving process is not performed.

Figure 8:
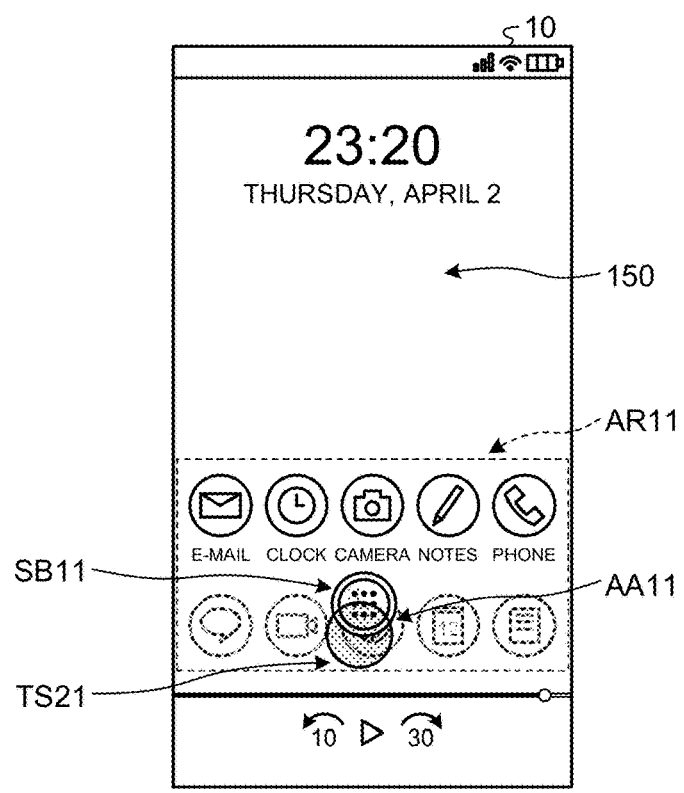
FIG. 8 is a diagram illustrating an example of a display mode of the operation area according to the embodiment.

FIG. 8 is a diagram illustrating an example of a display mode of the operation area according to the embodiment. In FIG. 8, the operation area SB11 is located in the center area of the display unit 150, and thus has a circular shape. FIG. 8 illustrates a case where the operation area SB11 is superimposed on an icon AA11 of the application included in the execution information AR11. For example, this is a case where a user places the operation area SB11 right above the icon AA11. The control unit 140 executes processing of displaying the operation area SB11 in a layer higher than the other display information on the display screen, including the displayed application and execution information or the like.

Thus, when the operation area SB11 is superimposed on the other display information on the display screen, the control unit 140 executes processing with priority given to the operation on the operation area SB11 since the operation area SB11 is in the upper layer. For example, in a case where the operation area SB11 is superimposed on the icon AA11, when a user operates the superimposed range of the operation area SB11 and the area of the icon AA11, the control unit 140 executes processing assuming that the operation has been performed on the operation area SB11. Note that in FIG. 8, an operation finger detected position TS21 is displayed when the user operates the superimposed range of the operation area SB11 and the icon AA11. Furthermore, when the user operates an area out of the superimposed range of the operation area SB11 and the icon AA11, the control unit 140 executes processing corresponding to the operated display information.

Furthermore, in a case where the operation area SB11 is superimposed on other display information, the control unit 140 may execute processing of displaying the operation area SB11 in a specific mode to ensure the visibility of the operation area SB11. For example, the control unit 140 may execute processing of displaying the operation area SB11 in a conspicuous manner, for example, with larger size than in a case where the operation area SB11 is not superimposed on other display information. Furthermore, for example, the control unit 140 may execute processing of displaying the operation area SB11 with higher color density or brightness than in a case where the operation area SB11 is not superimposed on other display information. Thus, the control unit 140 may execute processing of controlling for a float icon not to be buried.

2. MODIFICATION OF EMBODIMENT

The embodiment of the present disclosure has been described above. Next, modifications of the embodiment of the present disclosure will be described. Note that the modifications described below may be applied to the embodiment of the present disclosure alone, or may be applied to the embodiment of the present disclosure in combination. Further, the modifications may be applied instead of the configuration described in the embodiment of the present disclosure, or may be additionally applied to the configuration described in the embodiment of the present disclosure.

(Disablement 1)

In the above embodiment, the case where the operation area SB11 is placed in a higher layer than the other display information has been described. In the above embodiment, when the operation area SB11 is superimposed on other display information, there is a case where the other superimposed display information cannot be operated. Here, in the above-described embodiment, the information processing device 10 may have a function of disabling the operation area SB11. The control unit 140 may execute processing of disabling the operation area SB11, for example, at the time of activation of a specific application. In addition, when the operation area SB11 is disabled, the control unit 140 executes processing of not displaying the operation area SB11. Furthermore, applications that are targets for the disablement may be set in advance by default or may be selected by a user. Consequently, when the operation area SB11 is disabled, the user can operate the other expression information on which the operation area SB11 has been superimposed.

Furthermore, the control unit 140 regards the applications that are targets for the disablement as blacklist targets, and when a blacklist target is activated, the control unit 140 executes processing of not displaying the operation area SB11 until a predetermined condition is satisfied. Note that "until a predetermined condition is satisfied" means, for example, until the activation of the blacklist target ends, until a predetermined time period elapses, or the like. Note that examples of the blacklist target include a camera application, a communication setting application, a screen saver, or the like. Furthermore, when a predetermined condition is satisfied, the control unit 140 enable the operation area SB11 and executes processing of displaying the operation area SB11. At this time, the control unit 140 executes processing of displaying the operation area SB11 at a position thereof on the display screen immediately before the operation area SB11 is removed.

(Disablement 2)

In the above embodiment, the operation area SB11 can be disabled as well other than when a specific application is activated. For example, the control unit 140 may execute processing of disabling the operation area SB11 for a predetermined time period by operating an area other than the operation area SB11 on the display screen. In addition, when the operation area SB11 is disabled, the control unit 140 executes processing of not displaying the operation area SB11. A specific description will be given below with reference to FIG. 8.

In FIG. 8, the operation area SB11 is displayed, on the display screen, to be superimposed on the icon AA11, which is another display information. The control unit 140 may execute processing of disabling the operation area SB11 for a predetermined time period by operating an area other than the operation area SB11, such as the center of the display screen, for example. Consequently, a user can operate the icon A11. While the operation area SB11 is disabled, the control unit 140 may receive an operation on the icon A11 and execute processing based on the operation on the icon A11.

Furthermore, after a predetermined time period of disablement has elapsed, the control unit 140 executes processing of displaying the operation area SB11. Specifically, the control unit 140 enables the operation area SB11 and executes processing of displaying the operation area SB11. At this time, the control unit 140 executes processing of displaying the operation area SB11 at a position thereof on the display screen immediately before the operation area SB11 is removed. Furthermore, the control unit 140, at displaying the operation area SB11 again, may execute processing of displaying the operation area SB11 in a specific mode. Furthermore, the control unit 140, at displaying the operation area SB11 again, may execute processing of displaying the operation area SB11 for a predetermined time period in a conspicuous manner. Consequently, the position of the operation area SB11 can be easily recognized.

Furthermore, with timing other than when described above, at the time of displaying the operation area SB11 again after the operation area SB11 has been disabled and a predetermined time period has elapsed, the control unit 140 may similarly execute processing of displaying the operation area SB11 in a specific mode until a predetermined time period elapses. Such timing includes, for example, when a new screen is opened, immediately after the screen transitions, or immediately after the application is activated. Thus, the control unit 140 can perform processing of removing the operation area SB11 for a moment and immediately thereafter displaying the operation area SB11 in a conspicuous manner for a moment.

(Range of Operation Area)

In the above embodiment, the range of the operation area SB11 for determining whether the operation is performed on the operation area SB11 is described as, for example, the display range in which the operation area SB11 is displayed. However, the present invention is not limited to this example. When the operation area SB11 has a circular shape, the range of the operation area SB11 may be, for example, a range within a square area circumscribing the operation area SB11. In this case, the control unit 140 determines whether an operation has been performed on the operation area SB11 based on whether the operation finger detected position is within the square area circumscribing the operation area SB11. Furthermore, when the operation area SB11 has a circular shape, the range of the operation area SB11 may be, for example, a range within a circular area of which a radius is at a predetermined distance from the center of the operation area SB11. Furthermore, when the operation area SB11 has a bar shape, the range of the operation area SB11 may be, for example, a range within an area of a bar having a thickness several times the thickness of the operation area SB11. Thus, the detected range of the operation area SB11 may be larger than the display range that is actually displayed. Note that in the case where the detected range of the operation area SB11 is made larger than the display range of the operation area SB11, the detected range may be displayed on the screen in a display mode that is distinguishable from the operation area SB11 for, for example, a predetermined period immediately after a user performs the operation on the operation area SB11 so that the user can visually recognize the detected range. The display mode that is distinguishable is, for example, to display the detected range in light white color, or the like.

(Maintenance of Operability)

In the above embodiment, in a case where the shape of the operation area SB11 changes, the operability is maintained between the operation on the operation area SB11 after change and the operation on the operation area SB11 before change. However, the present invention is not limited to this example, and the operability may be changed. For example, in a case where the shape of the operation area SB11 has a circular shape, the length of the operation area SB11 in the vertical direction is shorter than that in a case where the shape of the operation area SB11 has a bar shape. Then, the control unit 140 may reduce a threshold value of a trigger related to the trigger operation in the vertical direction. Consequently, for example, a user can perform the trigger operation of the vertical slide with respect to the operation area SB11 by a short slide. As described above, for example, the control unit 140 may execute processing of changing the operability between before and after the change in the shape of the operation area SB11 by changing the threshold value of the trigger related to the trigger operation in each direction according to the shape of the operation area SB11.

(Identification of Up, Down, Left, and Right)

In the above embodiment, in a case where the operation area SB11 is located in the center area of the display screen, unlike a case where the operation area SB11 is located in the edge area, there is a case where a user cannot appropriately perform the upward, downward, leftward, and rightward trigger operations. As a specific example, when a user slides the operation area SB11 upward, in a case where the information processing device 10 is inclined, there may be a case where the user slides the operation area SB11 obliquely upward instead of accurately upward. The control unit 140 may identify up, down, left, and right of the display screen using, for example, an acceleration sensor.

(Setting Change)

In the above embodiment, the display mode of the operation area SB11 can be changed from the default by setting, however the present invention is not limited to this example. For example, the above embodiment can be configured such that the display mode of the operation area SB11 can be changed, by setting, from the default only when the operation area SB11 is for the edge area but the display mode of the operation area SB11 cannot be changed from the default when the operation area SB11 is for the center area. Furthermore, for example, for the operation area SB11 for the center area, only the size may be set to be unchangeable from the default, and other display modes may be set to be changeable.

3. EXAMPLE OF OPERATION FLOW

Figure 9:
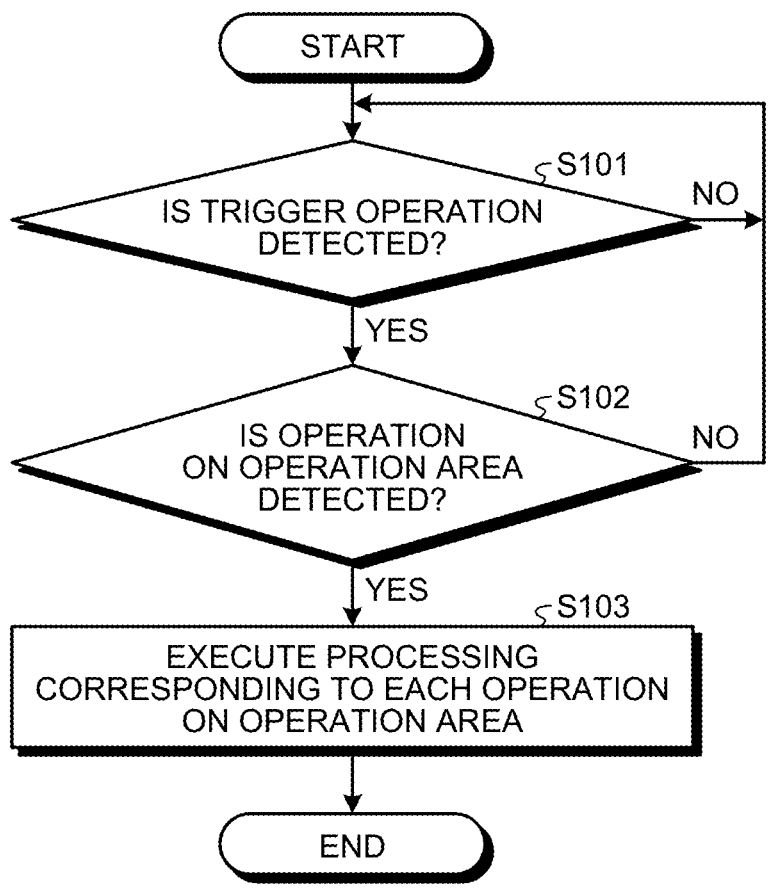
FIG. 9 is a diagram illustrating an example of a processing flow in the information processing device 10 according to the embodiment.

Next, an example of an operation flow of the information processing device 10 according to the embodiment will be described FIG. 9 is a diagram illustrating an example of a processing flow in the information processing device 10 according to the embodiment.

Referring to FIG. 9, first, it is determined whether the sensor unit 110 has detected a trigger operation on the display screen of the display unit 150 (step S101). In a case where it is determined that the sensor unit 110 has detected no trigger operation on the display screen of the display unit 150 (step S101; NO), the processing returns to step S101. On the other hand, in a case where it is determined that the sensor unit 110 has detected the trigger operation on the display screen of the display unit 150 (step S101; YES), the control unit 140 determines whether or not an operation has been performed on the operation area based on the operation finger detected position on the display unit 150 (step S102). In a case where the control unit 140 determines that no operation is performed on the operation area (step S102; NO), the processing returns to step S101. On the other hand, in a case where the control unit 140 determines that an operation has been performed on the operation area (step S102; YES), the control unit 140 executes processing corresponding to each operation (for example, the first operation to the fourth operation) on the operation area (step S103).

Figure 10:
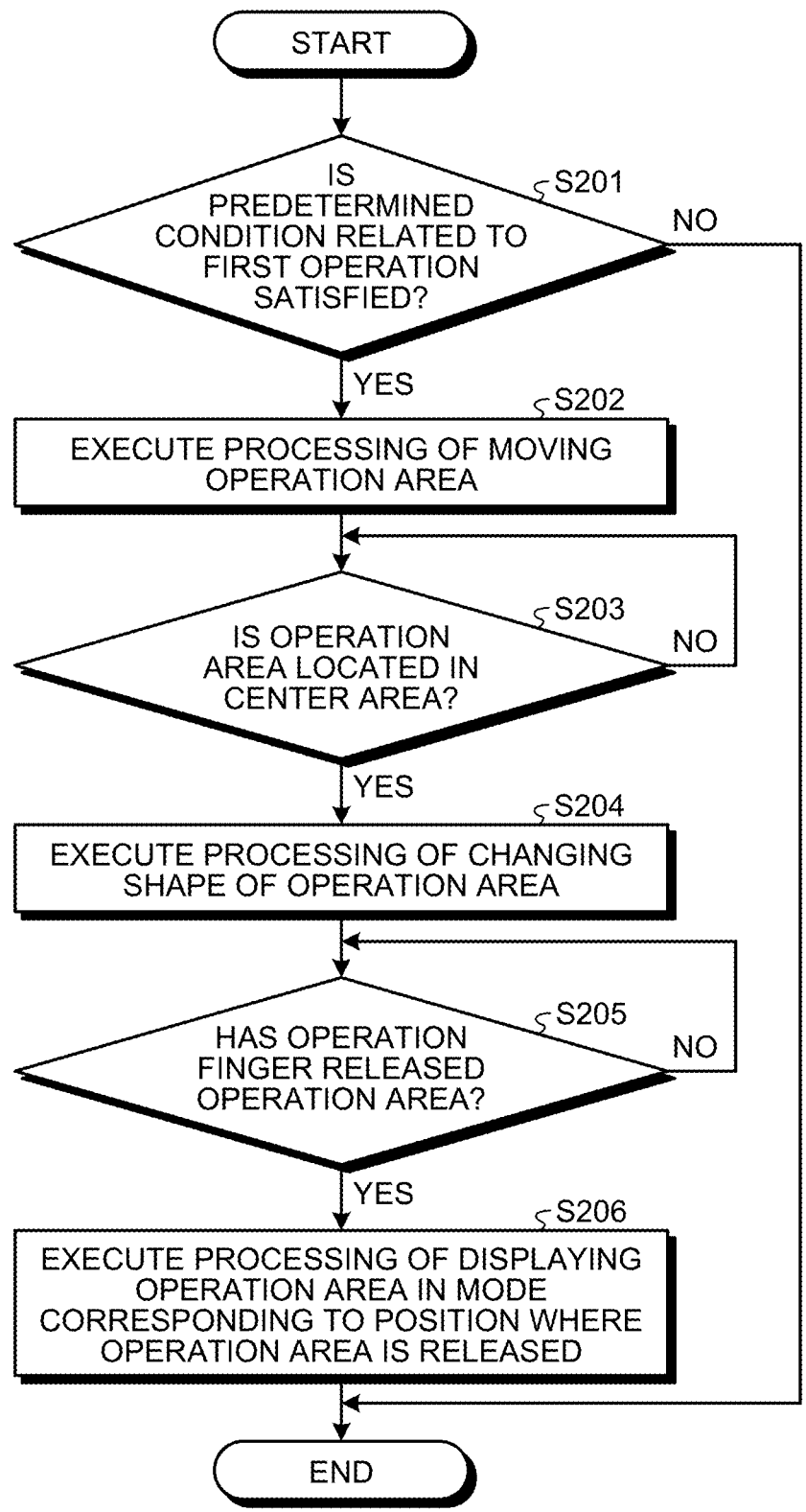
FIG. 10 is a diagram illustrating an example of a flow of moving processing of an operation area according to the embodiment.

Next, an example of a flow of moving processing of an operation area according to the embodiment will be described. FIG. 10 is a diagram illustrating an example of a flow of moving processing of an operation area according to the embodiment.

Referring to FIG. 10, first, the control unit 140 determines whether a predetermined condition related to the first operation for executing the moving processing of the operation area is satisfied (step S201). In a case where the control unit 140 determines that the predetermined condition related to the first operation is not satisfied (step S201; NO), the control unit 140 ends the information processing. On the other hand, in a case where the control unit 140 determines that the predetermined condition related to the first operation is satisfied (step S201; YES), the control unit 140 executes processing of moving the operation area to a position corresponding to the operation finger detected position on the display unit 150 and displaying the operation area (step S202). Furthermore, the control unit 140 determines whether the operation area is located in the center area of the display unit 150 (step S203). Specifically, for example, the control unit 140 stores in advance, as data, the range of the center area on the display screen, which is an area other than the edge areas, and determines whether the operation finger detected position on the display unit 150 is located in the center area. In a case where the control unit 140 determines that the operation area is not located in the center area (step S203; NO), the processing returns to step S203. In a case where the control unit 140 determines that the operation area is located in the center area (step S203; YES), the control unit 140 executes processing of changing the shape of the operation area and displaying the operation area (step S204).

Furthermore, the control unit 140 determines whether the operation area is released based on the operation finger detected position on the display unit 150 (step S205). In a case where the control unit 140 determines that the operation area is not released (step S205; NO), the processing returns to step S205. In a case where the control unit 140 determines that the operation area is released (step S205; YES), the control unit 140 executes processing of displaying the operation area in a mode corresponding to the position where the operation area is released (step S206).

4. HARDWARE CONFIGURATION EXAMPLE

Figure 11:
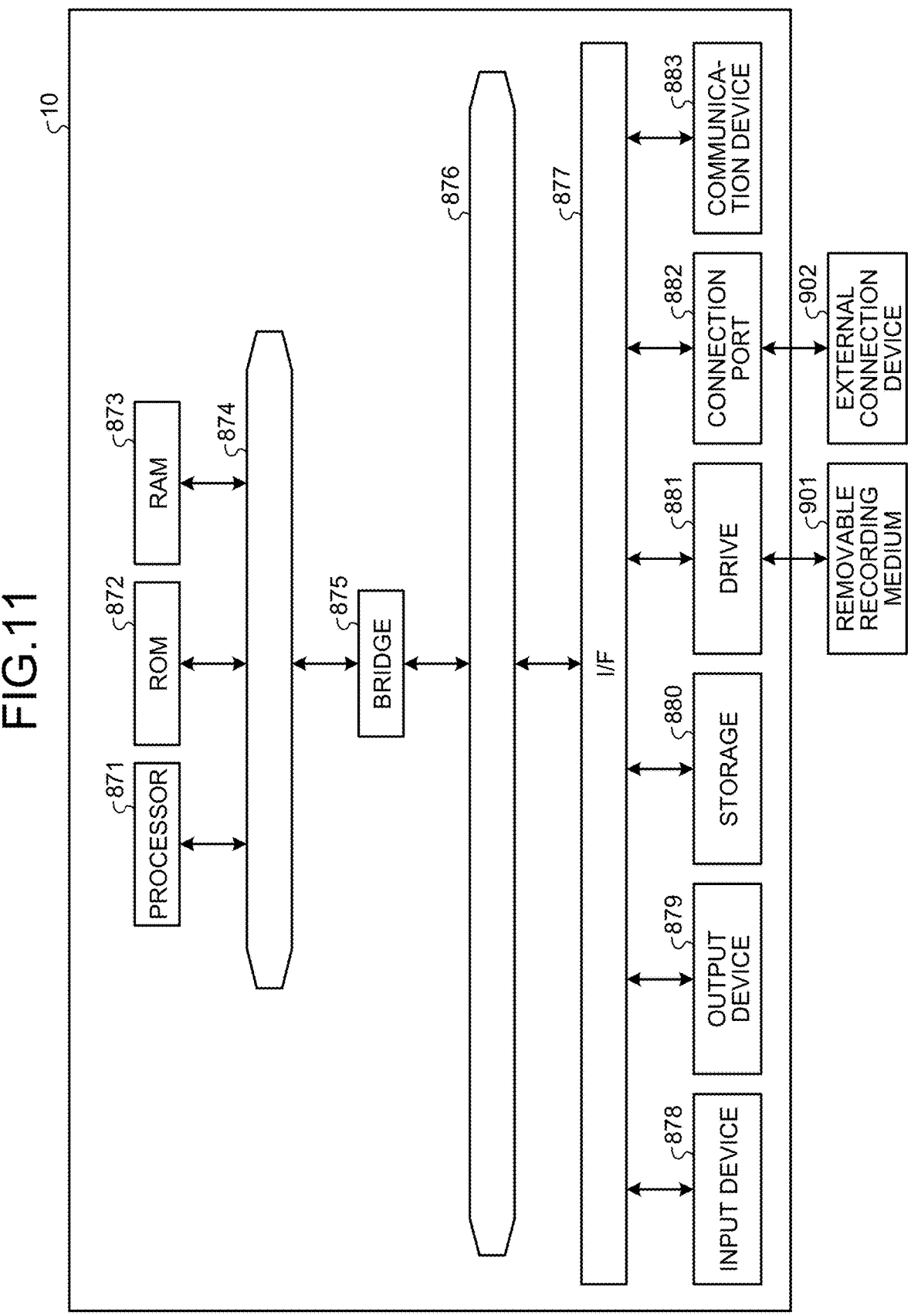
FIG. 11 is a block diagram illustrating a hardware configuration example of the information processing device according to an embodiment of the present disclosure.

Next, a hardware configuration example of the information processing device 10 according to an embodiment of the present disclosure will be described. FIG. 11 is a block diagram illustrating a hardware configuration example of the information processing device 10 according to an embodiment of the present disclosure. Referring to FIG. 11, the information processing device 10 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. In addition, components other than the components illustrated here may be further included.

(Processor 871)

The processor 871 functions as, for example, a processing unit or a control unit, and controls the overall operation of the components or a part thereof based on various programs recorded in the ROM 872, the RAM 873, the storage 880, or a removable recording medium 901.

(ROM 872, RAM 873)

The ROM 872 stores a program read by the processor 871, data used for calculation, and the like. The RAM 873 temporarily or permanently stores, for example, a program read by the processor 871, various parameters that appropriately change when the program is executed, and the like.

(Host Bus 874, Bridge 875, External Bus 876, Interface 877)

The processor 871, the ROM 872, and the RAM 873 are mutually connected via, for example, the host bus 874 capable of high-speed data transmission. On the other hand, the host bus 874 is connected to the external bus 876 having a relatively low data transmission speed via the bridge 875, for example. Furthermore, the external bus 876 is connected to various components via the interface 877.

(Input Device 878)

The input device 878 includes, for example, a mouse, a keyboard, a touch panel, a button, a switch, a lever, and the like. Furthermore, as the input device 878, a remote controller capable of transmitting a control signal using infrared rays or other radio waves may be used. Furthermore, the input device 878 includes a voice input device such as a microphone and the like.

(Output Device 879)

The output device 879 is a device capable of visually or audibly notifying a user of acquired information, and is, for example, a display device such as a cathode ray tube (CRT), an LCD, or an organic EL, an audio output device such as a speaker or a headphone, a printer, a mobile phone, a facsimile, or the like. Furthermore, the output device 879 according to the present disclosure includes various vibration devices capable of outputting tactile stimulation.

(Storage 880)

The storage 880 is a device that stores various data. The storage 880 includes, for example, a magnetic storage device such as a hard disk drive (HDD), a semiconductor storage device, an optical storage device, a magneto-optical storage device, or the like.

(Drive 881)

The drive 881 is a device that reads information recorded on the removable recording medium 901, or writes information to the removable recording medium 901. The removable recording medium 901 includes, for example, a magnetic disk, an optical disk, a magneto-optical disk, a semiconductor memory, or the like.

(Removable Recording Medium 901)

The removable recording medium 901 is, for example, a DVD medium, a Blu-ray (registered trademark) medium, an HD/DVD medium, various semiconductor storage media, or the like. Of course, the removable recording medium 901 may be, for example, an IC card on which a non-contact IC chip is mounted, an electronic device, or the like.

(Connection Port 882)

The connection port 882 is a port that connects an external connection device 902 such as a universal serial bus (USB) port, an IEEE 1394 port, a small computer system interface (SCSI), an RS-232C port, or an optical audio terminal or the like.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, and is, for example, a communication card for wired or wireless LAN, Bluetooth (registered trademark), or wireless USB (WUSB), a router for optical communication, a router for asymmetric digital subscriber line (ADSL), a modem for various communications, or the like.

5. SUMMARY

As described above, the information processing device according to an embodiment of the present disclosure has a function of executing processing of moving the operation area to the center area of the display screen by an operation on the operation area displayed in the edge area of the display screen. With such a function, further improvement in usability can be promoted.

Although the preferred embodiment of the present disclosure has been described in detail with reference to the accompanying drawings, the technical scope of the present disclosure is not limited to such examples. Those skilled in the art may find various alterations and modifications within the scope of the technical idea described in the claims, and it should be understood that they will naturally come under the technical scope of the present disclosure.

Furthermore, the effects described in this description are merely illustrative or exemplary, and are not restrictive. That is, in addition to or in the place of the above effects, the technique according to the present disclosure may achieve other effects that are obvious to those skilled in the art from the description in this description.

Note that the following configurations also belong to the technical scope of the present disclosure.

(1)

An information processing device including:
a control unit that executes processing of
displaying an operation area having a predetermined shape in an edge area of a display screen, and
moving the operation area to a center area of the display screen by a first operation set in advance as a predetermined operation on the operation area.

(2)

The information processing device according to (1), wherein
the control unit executes processing of changing a shape of the operation area in a case of moving the operation area to a center area of the display screen.

(3)

The information processing device according to (2), wherein
the control unit executes processing of maintaining an operability of an operation on the operation area before change of the shape for an operation on the operation area after the change of the shape.

(4)

The information processing device according to (3), wherein
the operation area before the change has a bar shape, and
the operation area after the change has a circular shape.

(5)

The information processing device according to any one of (1) to (4), wherein
the control unit executes processing of displaying execution information related to execution of a function of an application on the display screen by a second operation set in advance as the predetermined operation.

(6)

The information processing device according to (5), wherein
the control unit executes processing of determining an area in which the execution information is displayed based on position information of the operation area when the second operation is performed.

(7)

The information processing device according to (5) or (6), wherein
the execution information includes at least one icon related to the application identified based on a predetermined criterion, and
the control unit causes the application to execute predetermined processing based on an operation on the icon.

(8)

The information processing device according to any one of (1) to (7), wherein
the control unit, in a case where the operation area is superimposed on other display information on the display screen, executes processing based on an operation on the operation area.

(9)

The information processing device according to any one of (1) to (8), wherein
the control unit, in a case where an area other than the operation area is operated on the display screen, executes processing of not displaying the operation area until a predetermined time period elapses.

(10)

The information processing device according to (9), wherein
when displaying the operation area after the predetermined time period elapses, the control unit executes processing of displaying the operation area in a specific mode until a predetermined time period elapses.

(11)

The information processing device according to any one of (1) to (10), wherein
the information processing device includes a touch panel.

(12)

The information processing device according to any one of (1) to (11), wherein
the information processing device is a mobile terminal.

(13)

An information processing method that is performed by an information processing device, including:
executing processing of displaying an operation area having a predetermined shape in an edge area of a display screen, and
moving the operation area to a center area of the display screen by a first operation set in advance as a predetermined operation on the operation area.

(14)

An information processing program causing an information processing device to execute processing of
displaying an operation area having a predetermined shape in an edge area of a display screen, and
moving the operation area to a center area of the display screen by a first operation set in advance as a predetermined operation on the operation area.

REFERENCE SIGNS LIST

10 INFORMATION PROCESSING DEVICE
20 NETWORK
110 SENSOR UNIT
120 INPUT UNIT
130 STORAGE UNIT
140 CONTROL UNIT
150 DISPLAY UNIT
160 IDENTIFICATION UNIT
170 COMMUNICATION UNIT

The invention claimed is:

1. An information processing device comprising:
circuitry configured to
display an operation area having a predetermined shape in an edge area of a display screen, and
move the operation area to a center area of the display screen by a first operation set in advance as a predetermined operation on the operation area, the operation area being a single operation area displayed and the operation area being displayed in the center area of the display screen, and spaced apart from all edges of the display screen, after movement thereof.

2. The information processing device according to claim 1, wherein the circuitry executes processing of changing a shape of the operation area in a case of moving the operation area to a center area of the display screen.

3. The information processing device according to claim 2, wherein the circuitry executes processing of maintaining an operability of an operation on the operation area before change of the shape for an operation on the operation area after the change of the shape.

4. The information processing device according to claim 3, wherein
the operation area before the change has a bar shape, and
the operation area after the change has a circular shape.

5. The information processing device according to claim 1, wherein the circuitry executes processing of displaying execution information related to execution of a function of an application on the display screen by a second operation set in advance as the predetermined operation.

6. The information processing device according to claim 5, wherein the circuitry executes processing of determining an area in which the execution information is displayed based on position information of the operation area when the second operation is performed.

7. The information processing device according to claim 5, wherein
the execution information includes at least one icon related to the application identified based on a predetermined criterion, and
the circuitry causes the application to execute predetermined processing based on an operation on the icon.

8. The information processing device according to claim 1, wherein the circuitry, in a case where the operation area is superimposed on other display information on the display screen, executes processing based on an operation on the operation area.

9. The information processing device according to claim 1, wherein the circuitry, in a case where an area other than the operation area is operated on the display screen, executes processing of not displaying the operation area until a predetermined time period elapses.

10. The information processing device according to claim 9, wherein when displaying the operation area after the predetermined time period elapses, the circuitry executes processing of displaying the operation area in a specific mode until a predetermined time period elapses.

11. The information processing device according to claim 1, wherein the information processing device includes a touch panel.

12. The information processing device according to claim 1, wherein the information processing device is a mobile terminal.

13. The information processing device of claim 4, wherein the bar shape has a height dimension greater than a width dimension.

14. The information processing device of claim 11, wherein the first operation is received via a user finger interaction with the touch panel.

15. An information processing method that is performed by an information processing device, comprising:
    executing processing of displaying an operation area having a predetermined shape in an edge area of a display screen, and
    moving the operation area to a center area of the display screen by a first operation set in advance as a predetermined operation on the operation area, the operation area being a single operation area displayed and the operation area being displayed in the center area of the display screen, and spaced apart from all edges of the display screen, after movement thereof.

16. A non-transitory computer-readable medium storing computer-readable instructions that, when executed by a processor, cause the processor to perform a method comprising:
    displaying an operation area having a predetermined shape in an edge area of a display screen, and
    moving the operation area to a center area of the display screen by a first operation set in advance as a predetermined operation on the operation area, the operation area being a single operation area displayed and the operation area being displayed in the center area of the display screen, and spaced apart from all edges of the display screen, after movement thereof.

* * * * *